United States Patent
Keith et al.

(10) Patent No.: US 7,328,222 B2
(45) Date of Patent: *Feb. 5, 2008

(54) METHOD AND APPARATUS FOR PRESERVING DATA COHERENCY IN A DATABASE BY GENERATING A COMMAND OBJECT THAT INCLUDES INSTRUCTIONS FOR WRITING A DATA RECORD TO A LOCAL CACHE

(75) Inventors: Michael L. Keith, Ottawa (CA); Steven Vo, Ottawa (CA)

(73) Assignee: Oracle International Corporation, Redwood Shores, CA (US)

( * ) Notice: Subject to any disclaimer, the term of this patent is extended or adjusted under 35 U.S.C. 154(b) by 406 days.

This patent is subject to a terminal disclaimer.

(21) Appl. No.: 10/927,773

(22) Filed: Aug. 26, 2004

(65) Prior Publication Data

US 2006/0047718 A1    Mar. 2, 2006

(51) Int. Cl.
*G06F 17/00* (2006.01)
*G06F 9/44* (2006.01)
*G06F 12/00* (2006.01)

(52) U.S. Cl. .............. 707/103 R; 707/100; 707/103 Z; 717/108; 717/116; 717/120; 711/141

(58) Field of Classification Search ................ 707/1–2, 707/4–5, 104.1, 200, 100, 103 R, 103 Y, 707/103 Z; 711/3, 113, 119–123, 125–126, 711/130–132, 144, 141–142; 709/225–229; 717/108, 114, 116, 120, 165
See application file for complete search history.

(56) References Cited

U.S. PATENT DOCUMENTS 5,499,371 A    3/1996 Henninger et al. ......... 395/700

(Continued)

FOREIGN PATENT DOCUMENTS

WO    WO 98/38587    *   9/1998    .................... 17/30

(Continued)

OTHER PUBLICATIONS

Kjetil Norvag, signature caching in parallel object database systems, Information and softare technology, 44 (2002) pp. 331-341.*

(Continued)

*Primary Examiner*—Srirama Channavajjala
(74) *Attorney, Agent, or Firm*—Park, Vaughan & Fleming LLP

(57) ABSTRACT

A method of and system for managing cached data across disparate systems is disclosed. A system for providing cached data coherency includes: a client computer, an application server, a main database, one or more remote application servers, and a communication network interconnecting the client computer, the application server, the main database, and the one or more remote application servers. The application server being operable to respond to a data record being updated by the client computer, by: updating a cache local to the application server, updating the main database, generating a command object defining the updating of the data record, and sending the command object to the one or more remote application servers. The one or more remote application servers being operable to respond to the receipt of the command object by executing the command object, thereby storing the updated data record on caches local to the one or more remote application servers.

11 Claims, 5 Drawing Sheets

U.S. PATENT DOCUMENTS

| | | | |
|---|---|---|---|
| 5,615,362 A | 3/1997 | Jensen et al. | 395/614 |
| 5,706,506 A | 1/1998 | Jensen et al. | 395/614 |
| 5,809,543 A * | 9/1998 | Byers et al. | 711/162 |
| 5,870,759 A * | 2/1999 | Bauer et al. | 707/201 |
| 5,940,828 A * | 8/1999 | Anaya et al. | 707/8 |
| 6,016,394 A * | 1/2000 | Walker | 717/104 |
| 6,073,129 A * | 6/2000 | Levine et al. | 707/4 |
| 6,078,926 A * | 6/2000 | Jensen et al. | 707/103 R |
| 6,219,675 B1 * | 4/2001 | Pal et al. | 707/201 |
| 6,453,321 B1 * | 9/2002 | Hill et al. | 707/103 Y |
| 6,694,321 B1 * | 2/2004 | Berno | 707/101 |
| 6,748,490 B1 * | 6/2004 | Morein | 711/122 |
| 6,820,085 B2 * | 11/2004 | Nishizawa et al. | 707/10 |
| 6,910,052 B2 * | 6/2005 | Gates et al. | 707/201 |
| 6,941,310 B2 * | 9/2005 | Ahad et al. | 707/100 |
| 6,969,048 B2 * | 11/2005 | Colic et al. | 251/357 |
| 7,089,296 B2 * | 8/2006 | Dai et al. | 709/219 |
| 7,117,218 B2 * | 10/2006 | Tkachuk et al. | 707/100 |
| 7,155,428 B1 * | 12/2006 | Brown et al. | 707/4 |
| 2002/0103815 A1 * | 8/2002 | Duvillier et al. | 707/203 |
| 2002/0198883 A1 * | 12/2002 | Nishizawa et al. | 707/10 |
| 2003/0028683 A1 * | 2/2003 | Yorke et al. | 709/315 |
| 2003/0154216 A1 * | 8/2003 | Arnold et al. | 707/104.1 |
| 2005/0055384 A1 * | 3/2005 | Ganesh et al. | 707/202 |
| 2006/0053164 A1 * | 3/2006 | Ewing et al. | 707/104.1 |

FOREIGN PATENT DOCUMENTS

| | | | | |
|---|---|---|---|---|
| WO | WO 02071270 | * | 9/2002 | 17/30 |
| WO | WO 03/081464 | * | 10/2003 | 17/30 |
| WO | WO 2004077247 | * | 9/2004 | |
| WO | WO2005066789 | * | 7/2005 | |
| WO | WO 2006039239 | * | 4/2006 | 9/455 |
| WO | WO 2006074246 | * | 7/2006 | 17/30 |

OTHER PUBLICATIONS

Haengrae Cho et al. "maintaining cache coherency in a multisystem data sharing environment", Journal of systems architecture 45 (1998) pp. 285-303.*

El Zanfaly et al. "modeling and analysis of a multi-level caching database system", proceedings of the 46th IEEE international midwest symposium on circuits and systems, 2003, vol. 3, pp. 27-30.*

Haengrae Cho, "performance of cache coherency schemes in a shared disktransaction environment", proceedings of the sixth IEEE computer society workshop on future trends of distributed computing systems, 1997, pp. 154-161.*

Manri, T Sato et al. "using cache optimizing compiler for managing softwre cache on distributed shared memory system", HPC Asia '97 high performance computing on the information superhighway, 1997, pp. 312-318.*

Publication: "Symmetrical Multiprocessing" by Jan Matis, Sep. 25, 2000, Computerworld, http://www.computerworld.com/printthis/2000/0,4814,51028,00.html.

Publication: "5 Cache Fusion and the Global Cache Service" Oracle 9i Real Application Clusters Concepts, Release 1 (9.0.1.), part No. A89867-02, http://www.engin.umich.edu/caen/wls/software/oracle/rac.901/a89867/pslkgdtl.html.

Publication: "Oracle Application Server TopLink Unit of Work Primer", an Oracle White Paper, Aug. 2003, pp. 1-34.

Publication: "Oracle 9i AS Database Cache—Frequently Asked Questions", DB Cache, Oracle Technology Network, http://otn.oracle.com/products/ias/db_cache/dbcache_faq.html.

Publication: "How to Safely Use Coherent Caches in Servers" posted by wnewport, Jan. 26, the Server-experts dept.

Publication: "Creating Interfaces", The JAVA Tutorial, copyright 1995-2004 Sun Microsystems, Inc., http://java.sun.com/docs/books/tutorial/java/interpack/interfaces.htm.

Publication: "Recovery Options in Directory Based Software Coherency Schemes", Lory D. Molesky et al., Sep. 1996, www.google.ca/search?q=cache:RYfs...ps+coherent+cached+oracle&hl=en&ie=UTF-8.

* cited by examiner

FIGURE 1 - PRIOR ART

METHOD AND APPARATUS FOR PRESERVING DATA COHERENCY IN A DATABASE BY GENERATING A COMMAND OBJECT THAT INCLUDES INSTRUCTIONS FOR WRITING A DATA RECORD TO A LOCAL CACHE

The present invention relates generally to computers and computer databases, and more specifically, to a method of and system for managing cached data across disparate systems.

BACKGROUND OF THE INVENTION

Data communication networks such as the Internet, Wide Area Networks (WANs) and Local Area Networks (LANs), offer tremendously efficient means of organizing and distributing computerized data. These efficiencies have resulted in their widespread use for both business and personal applications. For example, the Internet is now commonly used to support database services across broad geographical areas—Internet banking, centralized office services and many other similar services are examples of systems which employ a single central database and multiple application servers, accessible over the Internet.

FIG. 1 presents an exemplary block diagram of such a database system 10. In this example, multiple copies or "instances" of a software application are operating on multiple servers or processors 12, 12'. Each of the application instances must access a main database 14 to obtain data, and store data to the main database 14 so that other application instances can access current versions of the shared data. End users employ client computers 16 to access the application instances on the multiple servers or processors 12, 12'. The communications between the client computers 16 and the multiple servers or processors 12, 12' may be done over the Internet or some other communication network, as may the communications between the multiple servers or processors 12, 12' and the main database 14.

As will be explained in greater detail hereinafter, in current versions of such systems where the caches must be kept coherent, the multiple instances of the software application, as well as the multiple servers or processors 12, 12' are usually homogeneous—employing the same structures, organization, protocols and store mechanisms. This homogeneity makes communication between the components of the system very easy to do.

Operation of such a system generally proceeds as follows: if, for example, an end user wishes to pay bills or transfer money from one bank account to another, he may use his client computer 16 to access an instance of a banking software application on server 12. The banking software application, in turn, retrieves data from the main database 14 and returns new data records resulting from end user transactions, to the main database 14. Clearly, the accessing and changing of data on the main database 14 must be properly coordinated so that all instances of the banking software application are handling "current" versions of the data.

It is also clear that a lot of resources can be consumed if all instances of a software application are continuously contacting the main database 14 in response to every access requirement or change in data. To avoid a massive number of communications which would be a huge burden on system resources, each instance of the software application typically uses a local cache 18, 18' to store data. With a local cache system, an instance of the software application can access the main database 14 to obtain a set of data which it stores in its local cache 18, 18'. While processing is performed by the instance of the software application, changes are made to the data in the local cache 18, 18' and the main database 14 is updated when all of the changes have been committed. Since the contents of the local caches 18, 18' are consistent with the data stored in the main database 14, the application instance may continue to access the data from the cache 18, 18' in lieu of going to the database 14.

In the case of Internet banking, for example, an instance of the software application on server 12' may read a summary sheet for a particular client from the main database 14, including account numbers, balances on each account, and a record of recent transactions, storing it on the local cache 18'. Rather than requesting this data from the main database 14 each time a client accesses information from the summary sheet, the instance application 12' accesses the information in its cache.

The difficulty is that if the application on server 12 performs a similar operation and loads the summary sheet for the same client into its local cache 18, and then makes a change that subsequently gets written back to the main database 14 then the contents of the local cache 18' are rendered stale and inconsistent with the data in the main database. There must be an additional mechanism to ensure that local cache 18 becomes aware that its state is no longer consistent. This is known as the "cache coherency" problem.

There are a number of mechanisms used in the art to ensure "data coherency" while processing on such systems; that is, ensuring that all instances of the software application are using current, accurate cached data. Two such mechanisms are "pessimistic locking" and "optimistic locking".

"Pessimistic locking" is a technique by which data on the main database 14 is "locked" as soon as it is accessed to be updated. Once the data to be updated has been locked, the instance of the software application that accessed the data can make the required changes, and then either "commit" or "rollback"—after which the lock is released. "Committing" means that the main database 14 is instructed to accept the new data, while "rollback" means that the changes have been rejected and the data is to be restored to its original state. If any other instance of the software application attempts to acquire a lock of the same data while it is being processed by an instance of the software application, they will be forced to wait until the earlier transaction has been completed.

This approach is called "pessimistic" because it presupposes that other instances of a software application will try to change a data record while a first instance is modifying it.

Pessimistic locking has at least three major problems:
1. "lockout", where one instance of a software application selects a record for update, and then fails to finish or abort the transaction. This locks out all other instances of the software application from accessing the locked out data;
2. "deadlock", where two instances of the software application are awaiting the release of locks held by the other. Say, for example, that Instance A and Instance B are both updating the main database 14 at the same time, and Instance A locks a record, then attempts to acquire a lock held by Instance B. If Instance B is waiting to obtain a lock held by Instance A, then neither transaction can be completed, and the two Instances will be "deadlocked"; and
3. performance degradation from requiring the software application on every server to access the data from the main database. This puts the application in the position of not being able to make reasonable use of its own local cache.

In contrast, "optimistic locking" does not lock records when they are read, but proceeds on the assumption that data being processed has not changed since it was read. Rather than taking out locks, an instance of a software application simply checks to see whether a data record has been updated since it obtained the data for editing. This approach is particularly useful in a stateless environment such as the World Wide Web. As well, because no locks are used, there are no lockout or deadlock problems.

However, optimistic locking does not provide "concurrency control". Concurrency control is a mechanism which ensures that data being stored on the main database 14 is consistent with the data that was read from it in the first place; that is, that no other transaction or instance of a software application has updated the data on the main database 14 after it was read.

Various methods of ensuring data consistency are known in the art. One simple technique is to read a "key value" along with a data record, and then write that same key value back to the main database 14 when the data record is updated. The main database 14 then changes the key value after a write so that other transactions can tell that the record was changed (i.e. by comparing the key value they hold, to the one currently associated with the data record). Should any other transaction or application instance attempt to update the record with the old (and now obsolete) key value, the database will recognize the key value as obsolete and reject the update.

Having addressed these major issues, Internet-based database technology is generally effective and technologically mature. However, the challenge of providing a distributed-application database system rises tremendously when the computers, the software or other components in the system, are different from one another.

Typically, the databases, caches and instances of software applications and other supporting software used in such systems are homogenous. That is, the databases and caches maintain the same structure and organization as one another, and all the protocols and store mechanisms are understood by all of the participants. It is much more difficult to coordinate the data between disparate applications running on differing hardware and operating system platforms.

An effective strategy for coordinating data between disparate applications running on differing hardware and operating system platforms has not yet been developed. There is therefore a need for a means of coordinating data over disparate computer systems, provided with consideration for the problems outlined above.

SUMMARY OF THE INVENTION

It is therefore an object of the invention to provide a method and system which obviates or mitigates at least one of the disadvantages described above.

One aspect of the invention is broadly defined as a method of providing cached data coherency access in a distributed-application database system comprising the steps of: in a first instance of a software application, responding to a data record being updated by a Client, by: updating a cache local to said first instance; updating a main database; generating a command object defining the updating of the data record; and sending the command object to a second instance of the software application; and in the second instance of the software application, responding to the receipt of the command object by: executing the command object, and storing the updated data record on a cache local to the other instance of the software application.

Another aspect of the invention is defined as a system for providing cached data coherency access comprising: a client computer; an application server; a main database; one or more remote application servers; and a communication network interconnecting the client computer, the application server, the main database, and the one or more remote application servers; the application server being operable to: respond to a data record being updated by the client computer, by: updating a cache local to the application server; updating the main database; generating a command object defining the updating of the data record; and sending the command object to the one or more remote application servers; and the one or more remote application servers being operable to: respond to the receipt of the command object by: executing the command object, thereby storing the updated data record on caches local to the one or more remote application servers.

BRIEF DESCRIPTION OF THE DRAWINGS

These and other features of the invention will become more apparent from the following description in which reference is made to the appended drawings in which.

DESCRIPTION OF THE PREFERRED EMBODIMENTS

Figure 2:
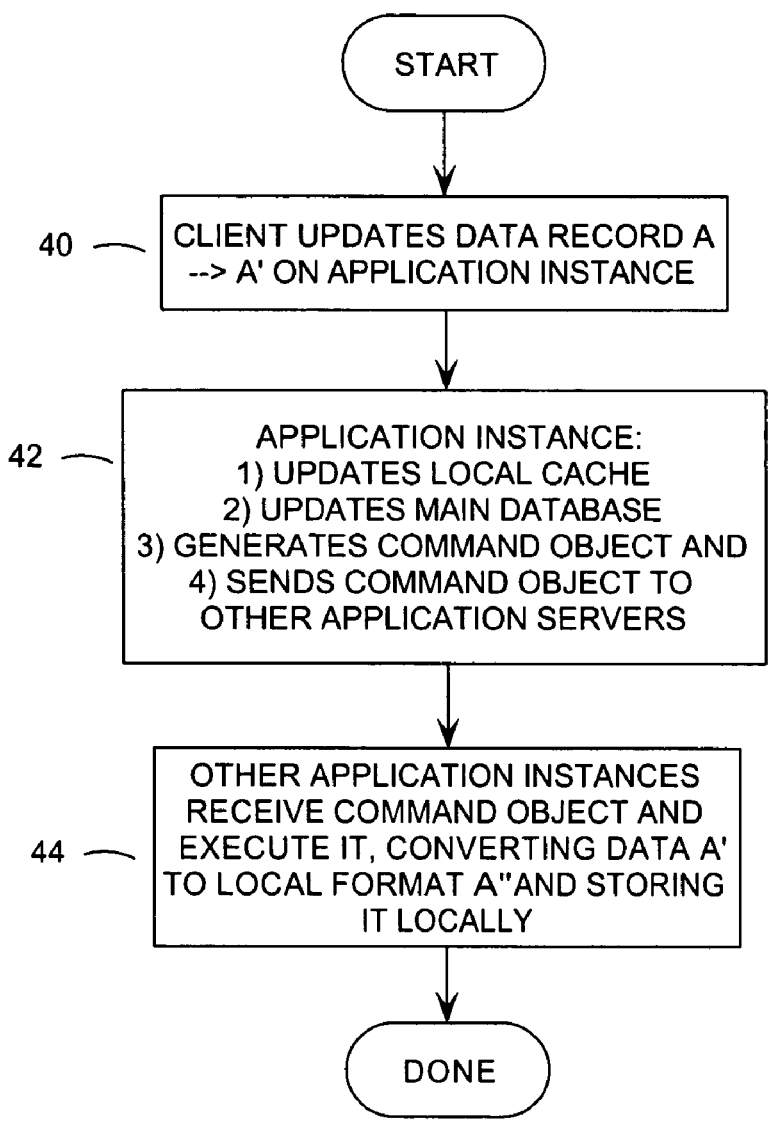
FIG. 2 presents a flow chart of a method of implementing a disparate, distributed-application, database system in a broad embodiment of the invention.

A methodology which broadly addresses the objects outlined above, is presented as a flow chart in FIG. 2. In general terms, this figure presents a method of providing cached data coherency across disparate systems.

The process begins when a client computer or end user updates a data record A to a new value A' on an instance of a software application per step 40 of FIG. 2. The instance of the software application receives this update and performs a number of actions per step 42. To begin with, it updates its local cache and sends instructions to the main database to update its records. The instance of the software application also generates an executable "command object" which it sends to other instances of the software application on the system. This "command object" is an executable object which defines any desired processing; in this exemplary case, it defines the change in a data record, from A to A'. As will be explained hereinafter, command objects can also be used to effect other database processes across the network of software application instances. When the other instances of the software application receive the command object at step 44 they execute it, which generally causes the new data A' to be converted to a local format A" and have A" stored on their respective local caches. If other functionality is defined by the command object, it will also be executed at this time.

With this methodology, the various instances of a software application can be supported by different platforms, have databases and caches with different structure and organization, and use different protocols and store mechanisms. It is no longer necessary that the various instances of the software application be homogenous. The command objects can be written in a universal format, independent of the operating parameters of the various software application instances.

This invention can be implemented over virtually any physical computer system or network. An exemplary system 50 is presented in the block diagram of FIG. 3. This system 50 is intentionally similar to the system 10 of FIG. 1 to emphasize the differences between the two.

Figure 1:
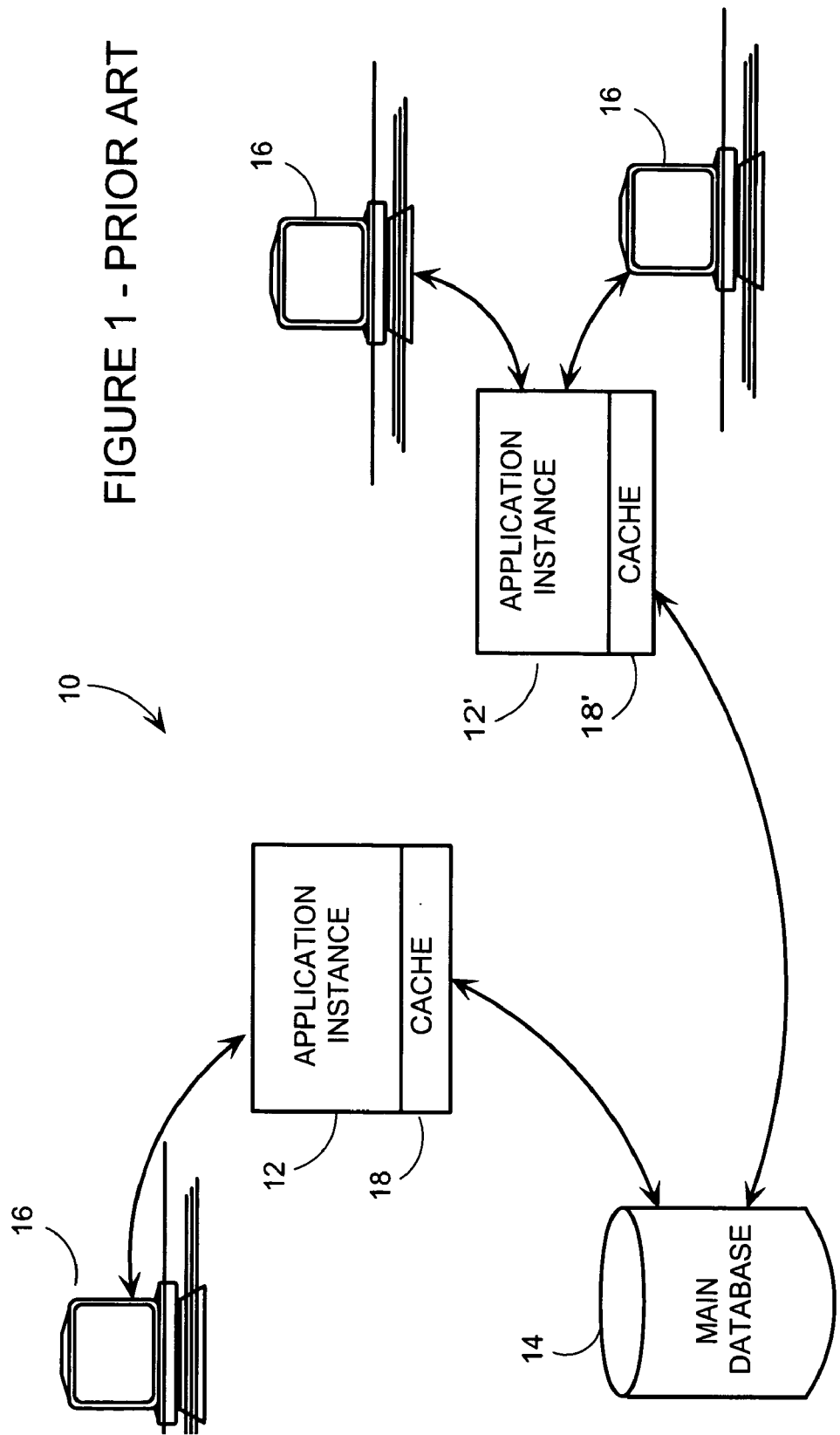
FIG. 1 presents a block diagram of a homogenous, distributed-application, database system as known in the art.

Each of the client computers 16 and the main database 14 may be the same as those of FIG. 1. The client computers 16 may be any form of interface to the system 50 including a desktop or laptop computer, smart terminal, personal digital assistant (PDA), point of sale computer, information kiosk, Internet-ready telephone or other similar wireless or hardwired interface or the like.

Figure 3:
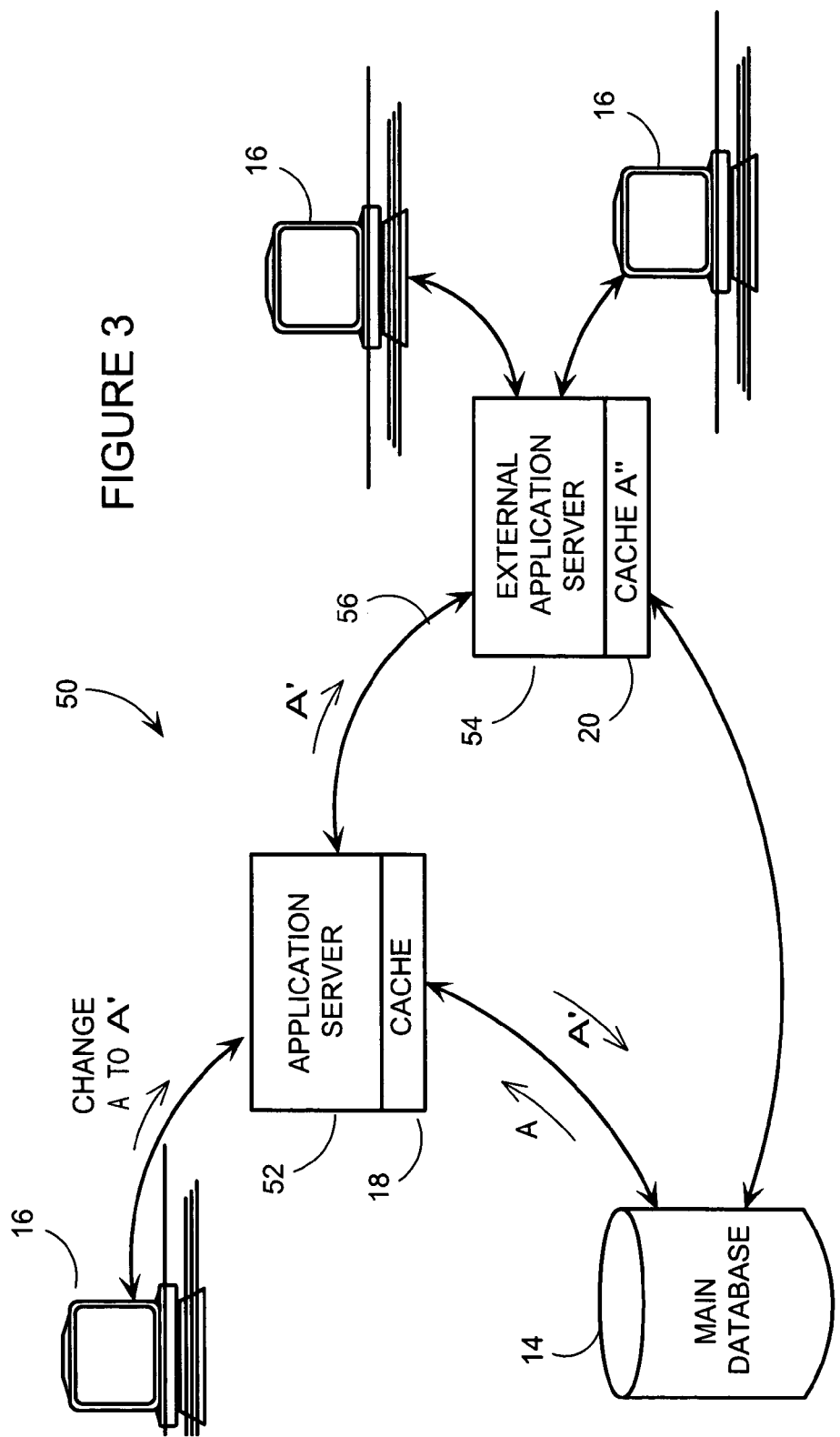
FIG. 3 presents a block diagram of a disparate, distributed-application, database system in a broad embodiment of the invention.

The two application servers 52, 54 and their associated local caches 18, 20 perform the basic function performed as the application instances 12, 12' and caches 18, 18' of FIG. 1, except that they may be completely different platforms; recall that all of the systems in FIG. 1 must be homogeneous to operate effectively. As well, of course, the two application servers 52, 54 must also have the functionality to support the methodology of the invention. This includes the functionality to generate and transmit command objects from one application server to another, which is represented in FIG. 3 by line 56. Of course, this line 56 is generally not a separate physical communication line, but is generally part of the communication network which interconnects all the application servers 52, 54 with the main database 14.

The communications between all of the components in this system 50 may be done over any communication network known in the art, and may consist of several different networks working together. These networks may include for example, wireless networks such as cellular telephone networks, the public switched telephone network, cable television networks, the Internet, ATM networks, frame relay networks, local area networks (LANs) and wide area networks (WANs). The client computers 16, for example, may access the system 50 via an Internet Service Provider (ISP) using a cable modem, telephone line mode, or wireless connection. The invention is not limited by the nature of any of these communication networks.

The flow of an exemplary data update is also shown in FIG. 3, following the example described above with respect to FIG. 2. If a client computer 16 wishes to update a data record A, then this data record A is first obtained from the main database 14 by the application server 52, and the application server 52 stores it on its local cache 18. When the client computer 16 causes this data record to be updated to a new value A', the application server 52 updates its local cache 18 to the new value, and sends the new value A' to the main database 14. The application server 52 also generates a command object which it transmits to the external application server 54. This command object defines the change in the data record from A to A', for the benefit of the external application server 54. The external application server 54 then executes this command object to obtain the locally formatted A" data record, which it stores in its local cache 20.

The system of FIGS. 2 and 3 addresses the problems in the art, providing a more effective way of sharing data and functionality across a network—in essence, it provides a distributed-application database system across disparate applications.

The system 50 also reduces the burden on the main database 14 because the various application servers 52, 54 do not have to repeatedly send queries to it. Instead, the various application servers 52, 54 are advised directly of changes made by other application servers. Processing is performed in a distributed way and is not signaled off the main database 14.

An advantage of certain embodiments of the invention is that from the perspective of the client computer or end user, the interface or the software that he interacts with is not changed. Embodiments employing the principles of the invention can be implemented for example, on an application server system where the end user has a personal computer with Web Browser software. Most Web browsers are implemented as graphical user interfaces.

Using a web browser, the end user typically enters requests by "opening" Web files, typing in Uniform Resource Locators (URLs), clicking on hypertext links or transmitting completed forms. In response, the Web browser builds an HTTP request and sends it to an Internet Protocol address indicated by a URL. The HTTP software in the destination server machine receives the request and, after any necessary processing, the requested file is returned.

The Hypertext Transfer Protocol (HTTP) is the set of rules for exchanging files on the World Wide Web, including text, graphic images, sound, video, and other multimedia files. Typically, the HTTP software on a Web server machine is designed to wait for HTTP requests and handle them when they arrive.

With this architecture, any changes or updates to the software application only have to be made on the application server, and not on the clients. This makes the upgrading process very easy. It also makes scaling the system easy—growth can be handled simply by adding more application servers to the system.

Figure 4:
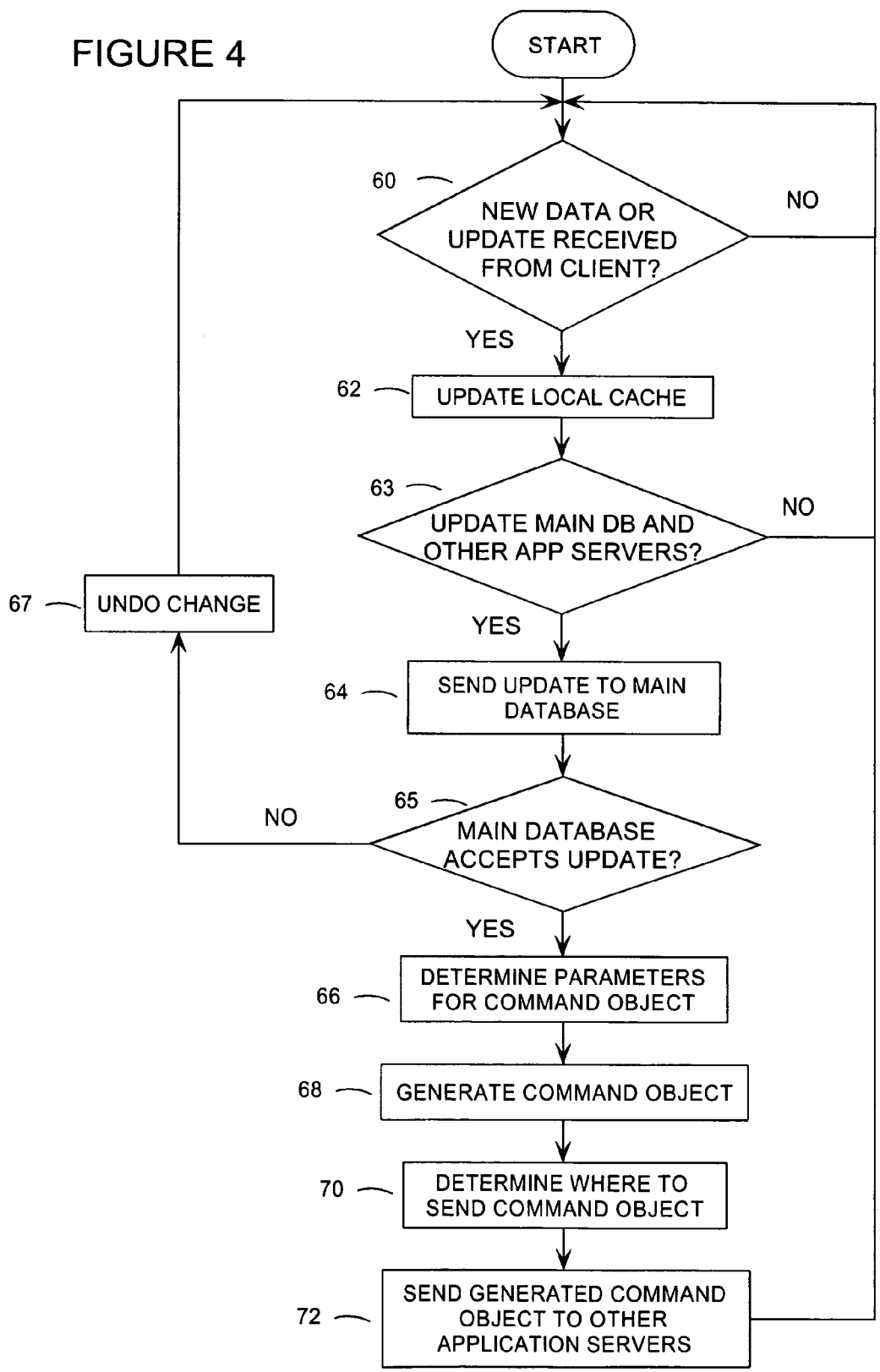
FIG. 4 presents a flow chart of a method of issuing command objects from an application server in a disparate, distributed-application, database system, in an embodiment of the invention.

The flow chart of FIG. 4 presents a simple methodology for implementing functionality in accordance with the principles of the invention. This flow chart has been deliberately simplified to emphasize the important steps. While the actual software code to implement this functionality would be more complex, the writing of this software code would be well within the capabilities of one skilled in the art in view of the description herein.

In the preferred embodiment, the application server software is implemented in Java™. Java is almost universally supported by Web servers and Web browsers, so it is a common choice for Web-based applications.

One of the main reasons for Java's popularity is the transportability of executable code. Java source code is compiled into a format called bytecode which can then be executed by a Java interpreter. This allows Java bytecode to be very mobile because Java interpreters and runtime environments, known as Java Virtual Machines (VMs), exist for most computer platforms.

An advantage of systems employing the principles of the invention is that the fundamental way in which the end users and application servers interact does not change. The only change is what the application servers do with the data received from the end users. As part of the intercommunication between the end user and the application server, the application server may receive new data and/or data updates. When the application server detects at step 60 of FIG. 4 that new data and/or data updates have been received, it proceeds to update its local cache at step 62. The local cache has to be kept current at all times.

Many systems employ more than one local cache, often employing a two-cache system: a local transactional cache, which is modified by software applications as they perform their processing, and a local shared cache. The local transactional cache may be rolled back if the commit to the main database 14 fails, while the local shared cache is only updated to reflect the updated object data after the commit to the main database 14. The caches which are updated on the remote application servers are the shared caches on those servers. Also, note that each application server may also have a number of different transactional caches, one for each transaction that is being serviced on that application server.

So if an object gets changed in a local transactional cache on an application server it will be committed to the main database 14, and then be updated in the local shared cache of that application server. The change will then be propagated to local shared caches of the other application servers.

Because the underlieing system of the invention relies on optimistic locking, it is not necessary to update the main database 14 and other application servers continuously. Hence, at step 63, a determination is made as to whether the main database 14 and other application servers 54 should be updated. If the decision is made not to update, then control simply returns to step 60 to await additional data updates from the end user. If the decision is made to update, then control passes to step 64.

The decision at step 63 may use a number of different tests to decide whether to update. For example, it could use any combination of the following:
1. update at the end of a user transaction;
2. update on close of a client session;
3. update when the volume of changes reaches a certain level; or
4. update periodically with respect to time (i.e. update every five minutes).

The decision may also be made not to update, for example, because:
1. changed data may not be persistent (it may be transient);
2. changes may not be acceptable to the application; or
3. previous changes in the same transaction may have failed.

At step 64, a message is sent to the main database 14 with the new and/or updated data. The main database 14 simply stores the new and/or updated data in accordance with the optimistic locking protocol described above. Of course, other locking protocols could also be used.

If the main database 14 rejects the data update at step 65, then an appropriate error handling routine must be executed at step 67. This would generally include, for example, rolling back the local cache and advising the end user of the problem. Control would then return to step 60 to await further instructions from the end user.

If the main database 14 accepts the data update at step 65, then the application server begins the process of generating and transmitting the command object corresponding to the new and/or updated data. The process can be implemented in slightly different ways depending on the specific software application and platform, but will generally follow along the lines of steps 66 through 72.

At step 66, the routine first determines what the parameters are for the command object being generated. If the routine is simply generating a command object to distribute new data, then this step will comprise little more than identifying the data to be distributed. If the command object is to initiate other processing on the external application servers, such as converting from one form of currency to another, then this would generally be determined at this point. Of course, a software application may choose to initiate other commands at any time, and not simply at the time of the database updates.

At step 68, the command object itself is generated. In one embodiment, to build a command object, we begin with a pre-determined pattern for an interface and a library of functions to add to it. A library of patterns can be stored on the application server, so that various functions can be generated. We define what the methods are (i.e. what the functions are), and write them into the interface template. Note that various mechanisms could used to effect this. In a Java environment, for example, a Java Interface could be used.

At step 70, the application server determines where to send the generated command object. This is generally done by determining which other application servers are involved in the system. Various "discovery protocols" exist for making this determination, including that described in the co-pending U.S. patent application Ser. No. 09/920,788, is now pending titled "Method and System for Object Cache Synchronization," the contents of which is incorporated herein by reference. These discovery protocols exist in part to allow the management of application servers going down and coming back up again, in a multiple server environment.

Note that this step could be performed at different stages in the process. For example, each application server could perform such a search when it comes online and advise other application servers of its presence. Other suitable methodologies are known in the art.

At step 72, the generated command object is sent to the other application servers in the system 50, for processing. This could be done various ways, by sending Internet packets directly to the other application servers, or possibly using some form of multicasting. Such techniques and other transport protocols are known in the art.

This completes the routine on the application server, and control will generally return to step 60 to await the receipt of further data updates from the end user.

As noted above, this is a simplified presentation of the process. Most software programs today are written in structured or object languages, so the software does not execute in such a linear way. This would be understood by one skilled in the art.

The processing performed by application servers receiving command objects will now be described with respect to the flow chart of FIG. 5. This is more complex to describe than the process of generating and sending command objects because the process may vary considerably with the specific platform of the recipient. Nonetheless, FIG. 5 presents a flow chart of the general methodology.

Figure 5:
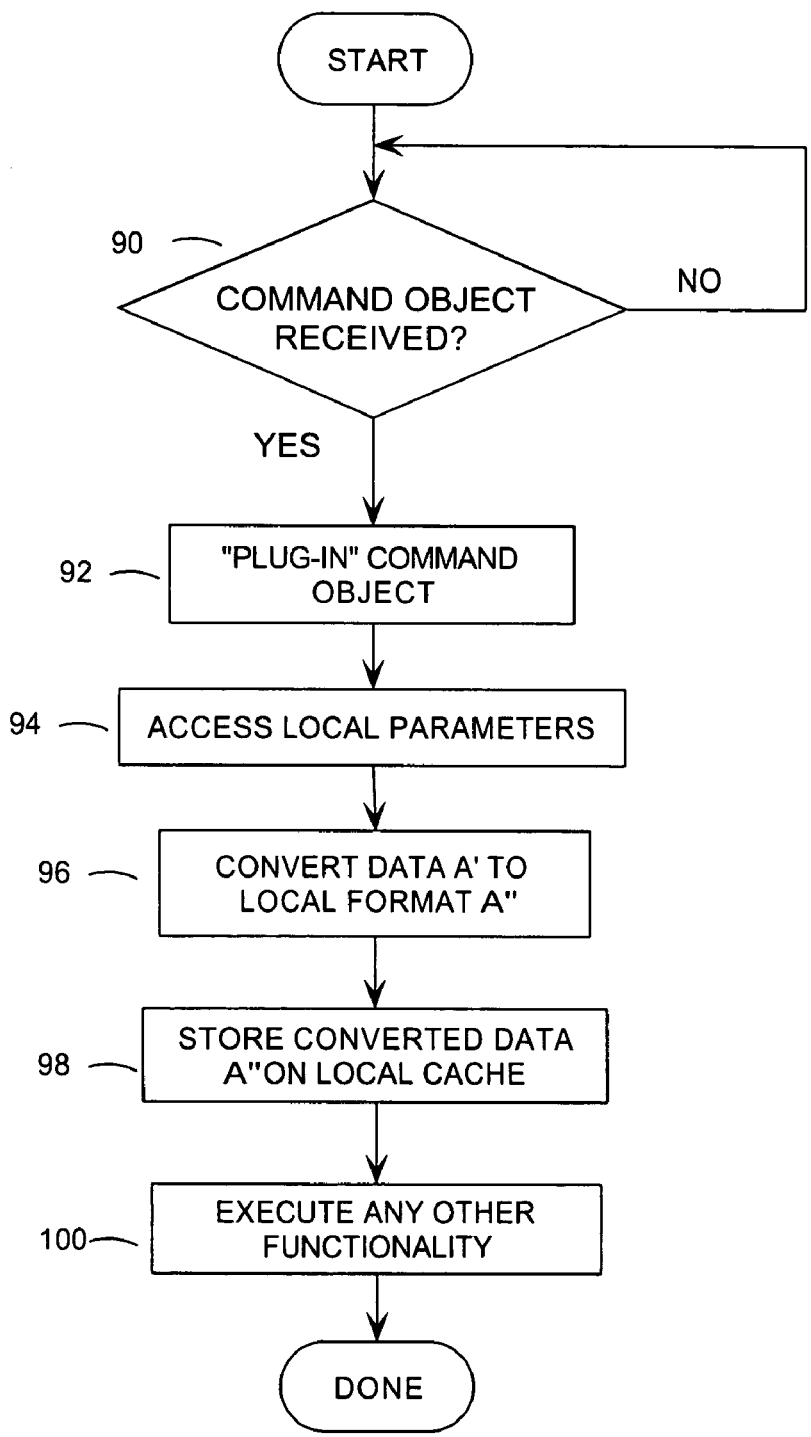
FIG. 5 presents a flow chart of a method of receiving and processing command objects on an application server in a disparate, distributed-application, database system, in an embodiment of the invention.

FIG. 5 shows the application server to be awaiting the arrival of a command object at step 90. Generally, the application server would not sit in such a loop, but would respond to the arrival of an Internet packet which calls certain routines, issues processing interrupts, and the like. The simplified representation of this test box as shown, is sufficient for the purposes of the description herein.

When it has been determined that a command object has been received at step 90, it is necessary to execute the command object in a way that is particular to that instance of the software application receiving the command object. To be consistent with the examples described herein, this will consist of:

converting received data into a format that is suitable to the instance of the software application receiving the command object; and acting on the command in an application-specific way that will cause its own data cache instance to be coherent with the other data caches in the system.

Of course, other functionality may also be defined by the command object.

At step 92, the command object is executed, by plugging it into a receiving application. As noted above, the framework for command objects is known to all parties in the system; that is, there is a universal specification for command objects. The command object specification can simply be plugged into the receiving application, and will be operable to function as defined by the command object's author.

As part of this execution, the command object will generally access local parameters at step 94 which define how the command is to be executed, where data is to be stored, what format it is to be stored in, and the like. Then, data can be converted to the local format at step 96, and stored in the local cache at step 98. Any other functionality can also be executed as part of this process at step 100.

Say, for example, that a certain application server is only interested in storing the covers of books which are sent to it. This processing would generally be performed as part of step 96. The command object(s) that is(are) received will include complete books, but the processing at step 96 strips off the book covers from the books, and stores the book cover in the local cache at step 98. Thus, the recipient application server has an opportunity to convert the data into the form it can best understand or most effectively deal with it.

As another example, say that a received command object was a bank account and objects are stored on the external software application in European currency. Then one could convert received funds into US currency and store that converted object in the local cache.

Thus, the A' data is converted to an A" form that is convenient or appropriate to the receiving application server, which stores the A" data format.

Previous ways of providing cache coherency required that participating application instances be of the same type or were cooperating very closely with each other, such that the caches were of the same structure. The system of the invention abstracts the process of a cache coherency protocol into something that any software application can easily plug into. This modularizes the active component of synchronizing cached data across the system so that software applications of the same or different types can share data, regardless of their data format or cache organization.

Using Java as a platform to span hardware and operating system platforms, and enabling the disparate application instances with a remote command proxy module, cached data can be shared and communicated to all participating application processes. The command argument data may take the form of object changes, or simply object identification information that acts as a directive to the receiving application instance. The pluggability of the remote command object using Java provides a particular effective way of providing the invention.

This solution allows the synchronization of data between multiple heterogeneous applications, and not just applications that are integrated into a single product or stack. Although its primary usage is to integrate object-to-relational persistence enabled applications, it facilitates the introduction of applications that make use of XML-based or other caching and storage schemes. The remote command facility also lays the groundwork for subsequent features in the distributed-application arena.

Other Options and Alternatives

The invention is not limited by the nature of the communication network or the underlieing computer system. The invention could be applied over any computer network or computer system, using any manner of platform. Other application servers that promote clustered architectures could be interested in similar technologies. The invention could also be used to support simple data updates or much more complex functionality such as:

1. extensive remote processing systems in distributed computing;
2. data replication schemes;
3. distributed event notification; and
4. other abstract uses for remote execution.

Conclusions

While particular embodiments of the present invention have been shown and described, it is clear that changes and modifications may be made to such embodiments without departing from the true scope and spirit of the invention.

The method steps of the invention may be embodiment in sets of executable machine code stored in a variety of formats such as object code or source code. Such code is described generically herein as programming code, or a computer program for simplification. Clearly, the executable machine code may be integrated with the code of other programs, implemented as subroutines, by external program calls or by other techniques as known in the art.

The embodiments of the invention may be executed by a computer processor or similar device programmed in the manner of method steps, or may be executed by an electronic system which is provided with means for executing these steps. Similarly, an electronic memory medium such computer diskettes, CD-Roms, Random Access Memory (RAM), Read Only Memory (ROM) or similar computer software storage media known in the art, may be programmed to execute such method steps.

What is claimed is:

1. A method for preserving data coherency in a computer system, comprising:

in a first software application,
   receiving a data record that is to be written to an entry in a local cache for the first software application, wherein the entry in the local cache is associated with an entry in a main database;
   writing the data record in the entry in the local cache;
   attempting to write the data record in the entry in the main database; and
   if the write to the entry in the main database fails,
      restoring a prior state to the entry in the local cache for the first software application, discarding the data record, and generating an error signal to a user; but
   if the write to the entry in the main database is successful,
      identifying the second software application as a software application that should execute the command object to write the data record in the entry in the local cache associated with the second software application;
      producing a command object, wherein the command object is a software module that includes instructions for writing the data record in an entry in a local cache associated with a second software application; and in a second software application, executing the command object to write the data record in the entry in the local cache associated with the second software application.

2. The method of claim 1, wherein when executing the command object, the method further comprises converting the data record into a data format used by the second software application.

3. The method of claim 2, wherein converting the data record involves:
determining local parameters for the second software application; and
converting the data record into the data format used by the second software application in accordance with the local parameters.

4. The method of claim 1, wherein producing a command object involves adding functions for writing the data record in the entry in the local cache associated with the second software application from a library of functions to a template command object.

5. The method of claim 1, wherein the command object comprises a pluggable software module, and wherein executing the command object involves plugging the command object into the second software application.

6. The method of claim 1, wherein the first software application and the second software application are coupled to one another through a communication network.

7. The method of claim 6, wherein the communication network comprises the Internet.

8. The method of claim 1, wherein the first software application and the second software application run on different platforms.

9. The method of claim 1, wherein receiving a data record involves receiving a new data record or receiving an update to an existing data record.

10. A computer-readable storage medium containing instructions that when executed by a computer cause the computer to perform a method for preserving data coherency in a computer system, the method comprising:
in a first software application,
receiving a data record that is to be written to an entry in a local cache for the first software application, wherein the entry in the local cache is associated with an entry in a main database;
writing the data record in the entry in the local cache;
attempting to write the data record in the entry in the main database; and
if the write to the entry in the main database fails,
restoring a prior state to the entry in the local cache for the first software application, discarding the data record, and generating an error signal to a user; but
if the write to the entry in the main database is successful,
identifying the second software application as a software application that should execute the command object to write the data record in the entry in the local cache associated with the second software application;
producing a command object, wherein the command object is a software module that includes instructions for writing the data record in an entry in a local cache associated with a second software application; and
in a second software application, executing the command object to write the data record in the entry in the local cache associated with the second software application.

11. A system for preserving data coherency in a computer system, comprising:
a client computer;
an application server;
a main database;
one or more remote application servers; and
a communication network interconnecting the client computer, the application server, the main database, and the one or more remote application servers;
the application server being operable to:
receive a data record from a client computer that is to be written to an entry in a local cache for the application server, wherein a main database includes an entry associated with the entry in the local cache;
write the data record in the entry in the local cache;
attempt to write the data record in the entry in the main database; and
if the write to the entry in the main database fails,
restore a prior state to the entry in the local cache for the first software application, discard the data record, and generate an error signal to a user; but
if the write to the entry in the main database is successful,
identify the second software application as a software application that should execute the command object to write the data record in the entry in the local cache associated with the second software application;
produce a command object, wherein the command object is a software module that includes instructions for writing the data record in an entry in a local cache associated with the one or more remote application servers; and
send the command object to the one or more remote application servers;
the one or more remote application servers being operable to execute the received command object, thereby storing the updated data record on caches local to the one or more remote application servers.

* * * * *